US012216504B2

(12) United States Patent
Luu et al.

(10) Patent No.: US 12,216,504 B2
(45) Date of Patent: Feb. 4, 2025

(54) COMPONENT PORT FOR AN ELECTRONIC DEVICE RESISTANT TO DAMAGE FROM FOREIGN DEBRIS

(71) Applicant: Google LLC, Mountain View, CA (US)

(72) Inventors: Alan Luu, San Francisco, CA (US); Renato Cabanban, San Diego, CA (US); Dennis Mccray, San Diego, CA (US); Chang Wei Tsao, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 10 days.

(21) Appl. No.: 17/840,813

(22) Filed: Jun. 15, 2022

(65) Prior Publication Data
US 2023/0409085 A1 Dec. 21, 2023

(51) Int. Cl.
G06F 1/16 (2006.01)
(52) U.S. Cl.
CPC ............ G06F 1/1656 (2013.01); G06F 1/163 (2013.01)
(58) Field of Classification Search
CPC ............................. G06F 1/1656; G06F 1/163
See application file for complete search history.

(56) References Cited

U.S. PATENT DOCUMENTS

| 9,408,009 | B1 | 8/2016 | Witte et al. | |
|---|---|---|---|---|
| 10,165,694 | B1* | 12/2018 | Werner | H04R 1/028 |
| 10,782,742 | B1* | 9/2020 | Spencer | G06F 1/163 |
| 11,564,025 | B2* | 1/2023 | Blundell | H04R 1/44 |
| 2004/0213426 | A1 | 10/2004 | MacRae | |
| 2014/0029782 | A1 | 1/2014 | Rayner | |
| 2014/0079269 | A1* | 3/2014 | Choi | H04R 1/342 |
| | | | | 381/365 |
| 2014/0307909 | A1 | 10/2014 | Yang et al. | |
| 2015/0163572 | A1 | 6/2015 | Weiss et al. | |
| 2015/0304753 | A1 | 10/2015 | Loeppert et al. | |
| 2022/0286539 | A1* | 9/2022 | Stobbe | H04M 1/026 |

* cited by examiner

Primary Examiner — James Wu
(74) Attorney, Agent, or Firm — DORITY & MANNING P.A.

(57) ABSTRACT

The present application provides a wearable computing device. The wearable computing device includes a housing, at least one internal component, and a port. The at least one internal component is positioned within the housing and includes an aperture. The port includes an exterior portion defining an opening in the wearable computing device, the exterior portion extending into the wearable computing device to define an inner wall, and an interior portion extending inward from the exterior portion of the port to the aperture of the component. The present application also provides methods for manufacturing a wearable computing device.

11 Claims, 8 Drawing Sheets

COMPONENT PORT FOR AN ELECTRONIC DEVICE RESISTANT TO DAMAGE FROM FOREIGN DEBRIS

FIELD

The present disclosure relates generally to an electronic device, and more particularly, to an electronic device having a component port with exterior and interior portions capable of resisting damage caused by foreign debris and/or fluid.

BACKGROUND

Recent advances in technology, including those available through consumer devices, have provided for corresponding advances in health detection and monitoring. For example, electronic devices, such as fitness trackers and smartwatches, are able to determine information relating to a person wearing the device and/or the environment surrounding the device. In addition, the electronic device is able to output a signal to the user based on either the input of the user, the configuration of the electronic device, and/or the environment surrounding the electronic device.

Such electronic devices generally have component features such as a microphone, an altimeter, and/or various sensors, which are placed within the electronic device for measuring/monitoring parameters of the user. Some of the components require access to an external environment to provide their specific type of functionality. Thus, a port is typically placed adjacent to these features which, for example, allows for a microphone to sense or output acoustics in the area outside of the electronic device. In another example, such a port allows for an altimeter to obtain measurements of outside atmospheric pressure for display to a user. However, when such ports are provided, foreign debris may be able to enter the electronic device through the port and reach the components, resulting in damage to the components.

Thus, it would be desirable to have an electronic device having one or more ports capable of resisting foreign-object induced damage. It would also be beneficial for such an electronic device to be easily and efficiently manufactured.

SUMMARY

Aspects and advantages of embodiments of the present disclosure will be set forth in part in the following description, or can be learned from the description, or can be learned through practice of the embodiments.

One example embodiment of the present disclosure is a wearable computing device. The wearable computing device includes a housing, at least one internal component, and a port. The at least one internal component is positioned within the housing and includes an aperture. The port includes an exterior portion defining an opening in the wearable computing device, the exterior portion extending into the wearable computing device to define an inner wall, and an interior portion extending inward from the exterior portion of the port to the aperture of the component.

Another aspect of the present disclosure is directed to the wearable device where the interior portion of the port is centered radially around the aperture of the internal component.

Yet another aspect of the present disclosure is directed to the wearable device where the internal component includes a microphone, an altimeter, or a combination thereof.

Still another aspect of the present disclosure is directed to the wearable device where the interior portion of the port joins the exterior portion of the port at an angle relative to the exterior portion where the angle ranges from about 10 degrees to about 85 degrees.

In a further aspect, the present disclosure is directed to the wearable device where the exterior portion of the port extends into the wearable computing device in a longitudinal direction where a channel connects the interior portion and the exterior portion.

In yet a further aspect, the present disclosure is directed to the wearable device where the channel extends from the exterior portion to the interior portion at an angle relative to the longitudinal direction in which the exterior portion extends where the angle ranges from about 85 degrees to about 95 degrees.

In still a further aspect, the present disclosure is directed to the wearable device where the interior portion is disposed above the exterior portion where the interior portion and the exterior portion are generally parallel to each other in a longitudinal direction.

In another aspect, the present disclosure is directed to the wearable device where the wall of the exterior portion is located beyond a region at which the exterior portion merges with the interior portion where the wall of the exterior portion is more proximal to the aperture of the component than the region at which the exterior portion merges with the interior portion.

In yet another aspect, the present disclosure is directed to the wearable device where the interior portion extends outward from the aperture of the component to define a second wall where the second wall is located above the exterior portion and towards the opening.

In still another aspect, the present disclosure is directed to the wearable device where a backing mesh is placed between the aperture of the component and the interior portion of the port.

In another embodiment, the present disclosure is directed to a method of manufacturing a wearable computing device. The method includes providing the wearable computing device where the wearable computing device has a component with an aperture therein. The method further includes forming an exterior portion of a port, the exterior portion defining an opening and extending into the wearable computing device to define a wall. The method further includes forming an interior portion of the port, the interior portion extending inward from the exterior portion of the port towards the aperture of the component.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
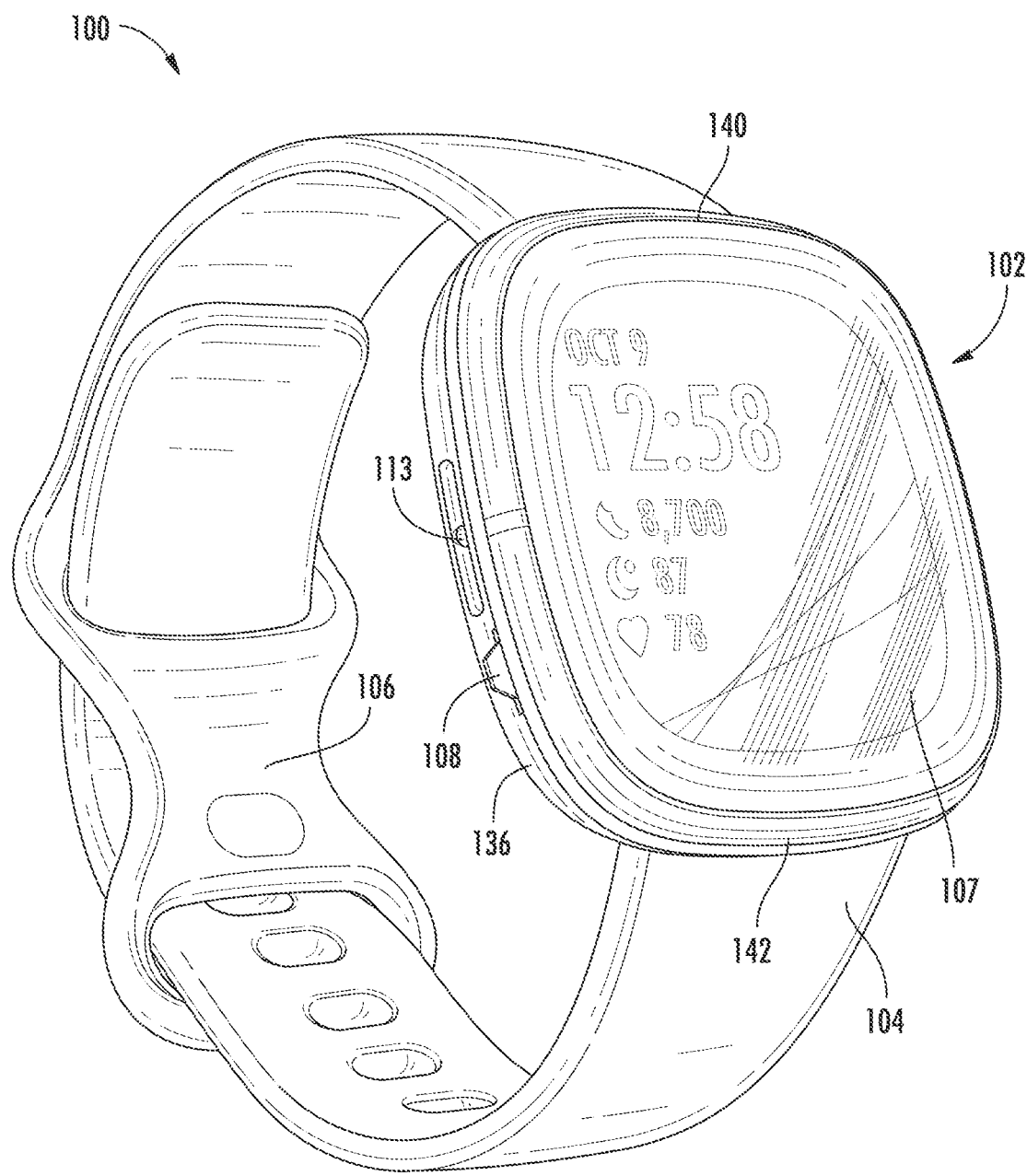
FIG. 1 provides a front, perspective view of an embodiment of an electronic device according to the present disclosure.

Reference numerals that are repeated across plural figures are intended to identify the same features in various implementations.

DETAILED DESCRIPTION

Any of the features, components, or details of any of the arrangements or embodiments disclosed in this application, including without limitation any of the electronic device embodiments and any of the methods of manufacturing said electronic device disclosed below, are interchangeably combinable with any other features, components, or details of any of the arrangements or embodiments disclosed herein to form new arrangements and embodiments.

Electronic devices, such as a laptop, a desk-top computer, or wearable devices (e.g., wristwatch, smartwatch, smart jewelry, fitness tracker, head mounted display) may include various types of internal components to provide the functionalities thereof. However, some of these components may require access to an external environment to provide their particular functionality. To this end, a port may be included in such electronic devices to provide a pathway to the external environment. For example, the port may allow for the output of audio and the influx of air resulting from atmospheric pressure which may be used for readings from an internal component, such as an altimeter. However, the port may be susceptible to foreign debris and/or fluid, thereby causing damage to the internal components.

In addition, a port for an electronic device may be manufactured through a variety of means. For example, a manufacturer may drill an initial pathway into the electronic device to function as a port. After drilling an initial pathway, the manufacturer may desire to have the port extend from the initial pathway in another direction. However, the manufacturer may find difficulty in inserting a drill to continue the pathway in another direction. This difficulty may then reduce the overall ease and efficiency of manufacturing the port and consequently the overall electronic device.

Thus, the present disclosure is related to an electronic device having a component port design that addresses the aforementioned issues. In particular, the electronic devices of the present disclosure includes one or more internal components with an aperture and a port having a particular geometry to reduce damage caused by foreign debris and/or fluid. More specifically, the port generally includes an exterior portion defining an opening in the electronic device and an interior portion with a particular geometry. The exterior portion extends into the electronic device to define a wall. Further, the interior portion extends inward from the exterior portion of the port towards the aperture of the internal component. Thus, by forming the exterior portion of the port with the wall and the interior portion with a particular geometry, foreign debris and/or fluid will not have a direct travel path to the internal components of the electronic device. Further, by encompassing these features in a singular port, ease and efficiency of manufacturing may be increased.

As such, without intending to be limiting, certain benefits provided by the present disclosure include a port structure capable of preventing foreign debris and/or fluid from entering the port and damaging internal components thereof. Further, in an embodiment, by encompassing these features in a singular port, ease and efficiency of manufacturing may be increased.

Figure 2:
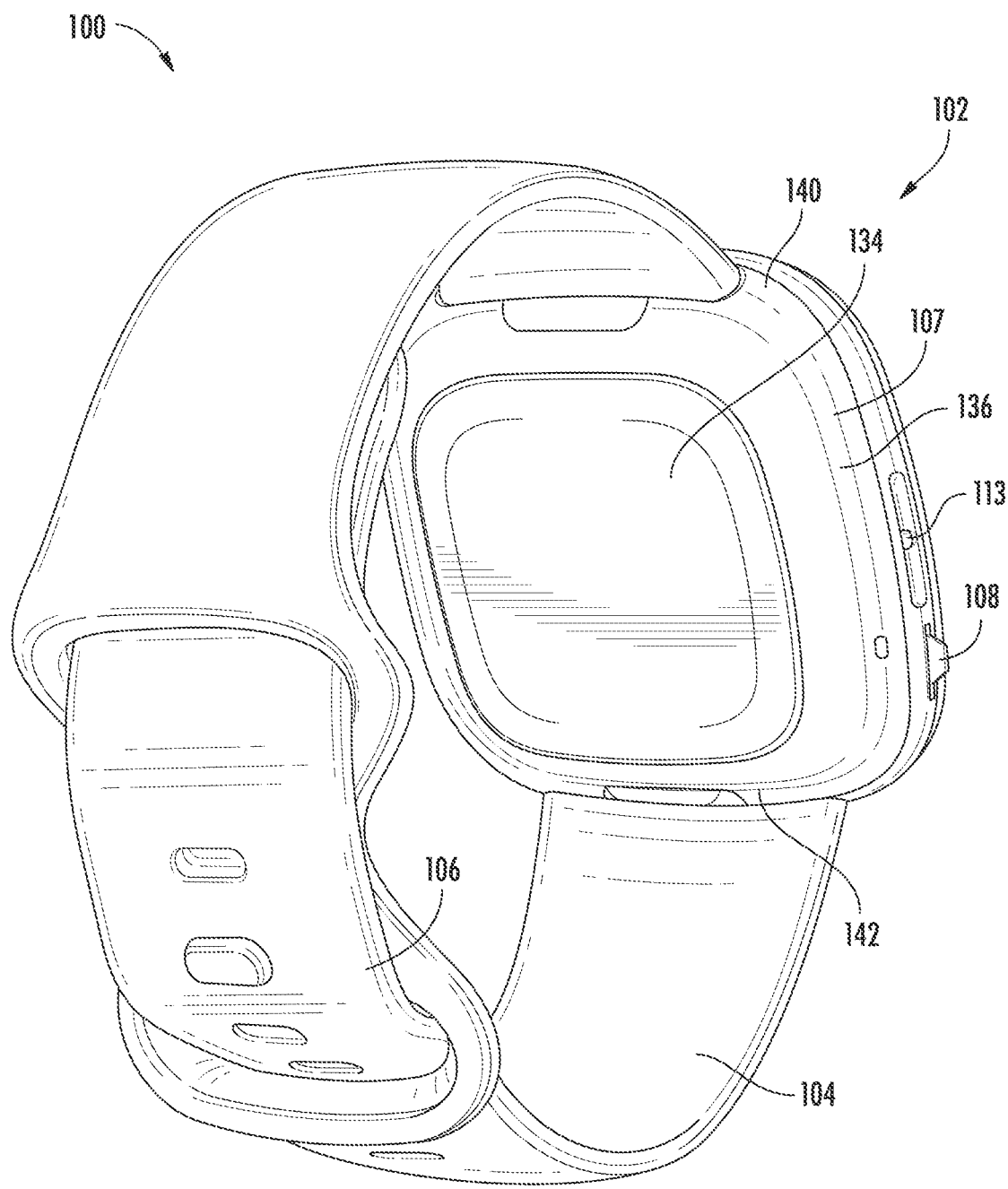
FIG. 2 provides a rear, perspective view of the electronic device of FIG. 1.
Figure 3:
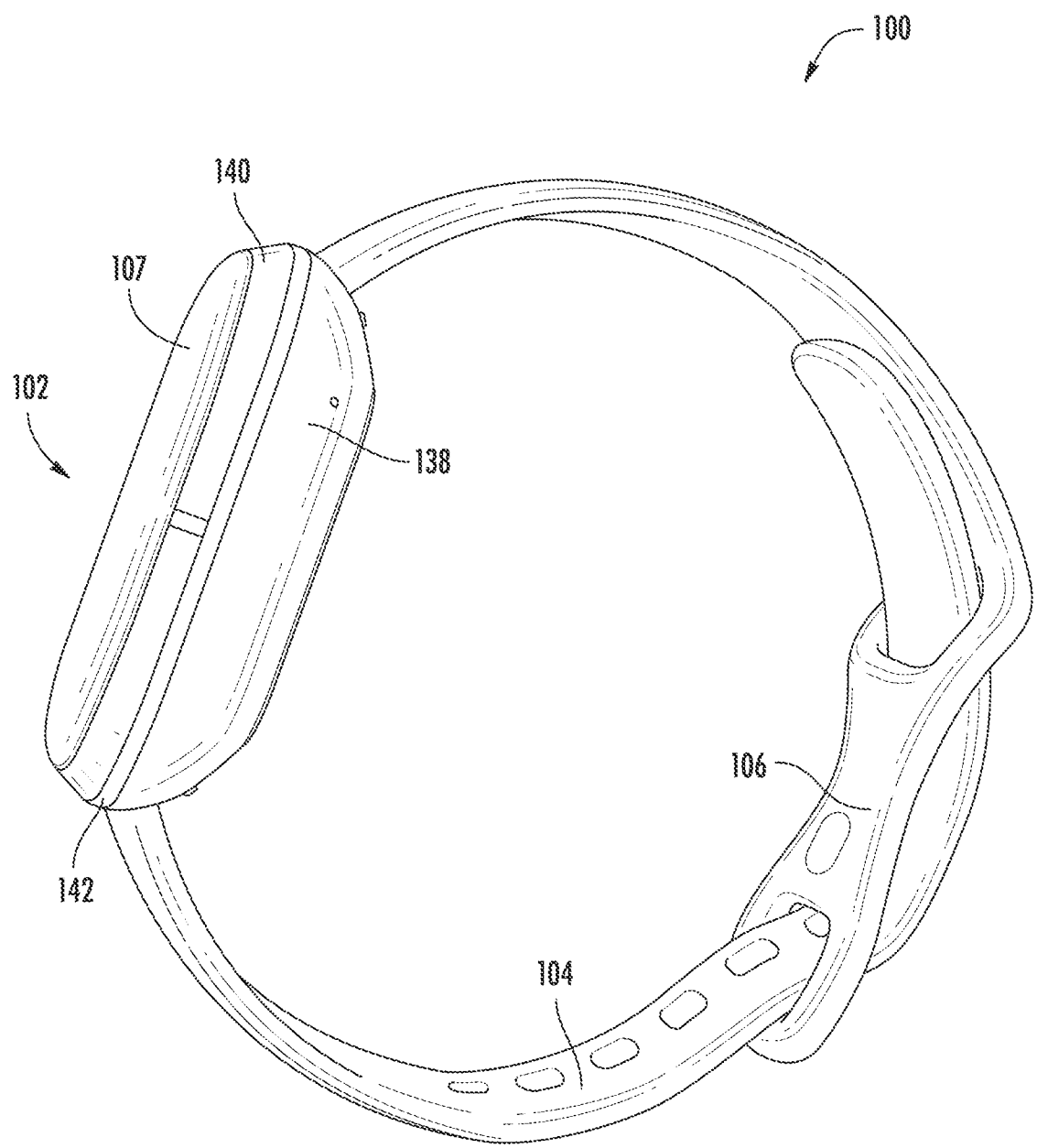
FIG. 3 provides a side, perspective view of the electronic device of FIG. 1.

Referring now to the drawings, FIGS. 1-3 illustrate a wearable computing device 100 according to an exemplary embodiment of the present disclosure. In particular, as shown in FIG. 1, the wearable computing device 100 may include a wristband 104 and a latch 106 for securing the wearable computing device 100 to a user's forearm like a wristwatch. In addition, as shown in FIGS. 1-3, the wearable computing device 100 has a housing 107 that contains the electronics/internal components associated with the wearable computing device 100. The housing 107 may include a back 134, a first side 136, a second side 138, a top 140, and a bottom 142. Further, as shown in FIGS. 1-3, the wearable computing device 100 includes an electronic display 102 arranged with the housing 107. Moreover, as shown in FIG. 1, the wearable computing device 100 may also include one or more buttons 108 that may be implemented to provide a mechanism to activate various sensors of the wearing computing device 100 to collect certain health data of the user. In addition, in an embodiment, the electronic display 102 may cover an electronics package (not shown), which may also be housed within the housing 107. Furthermore, as generally shown in FIGS. 1 and 2, the wearable computing device 100 may also include a component port 111 accessible via an opening 113 defined within the housing 107, which is described herein in more detail below.

Figure 4:
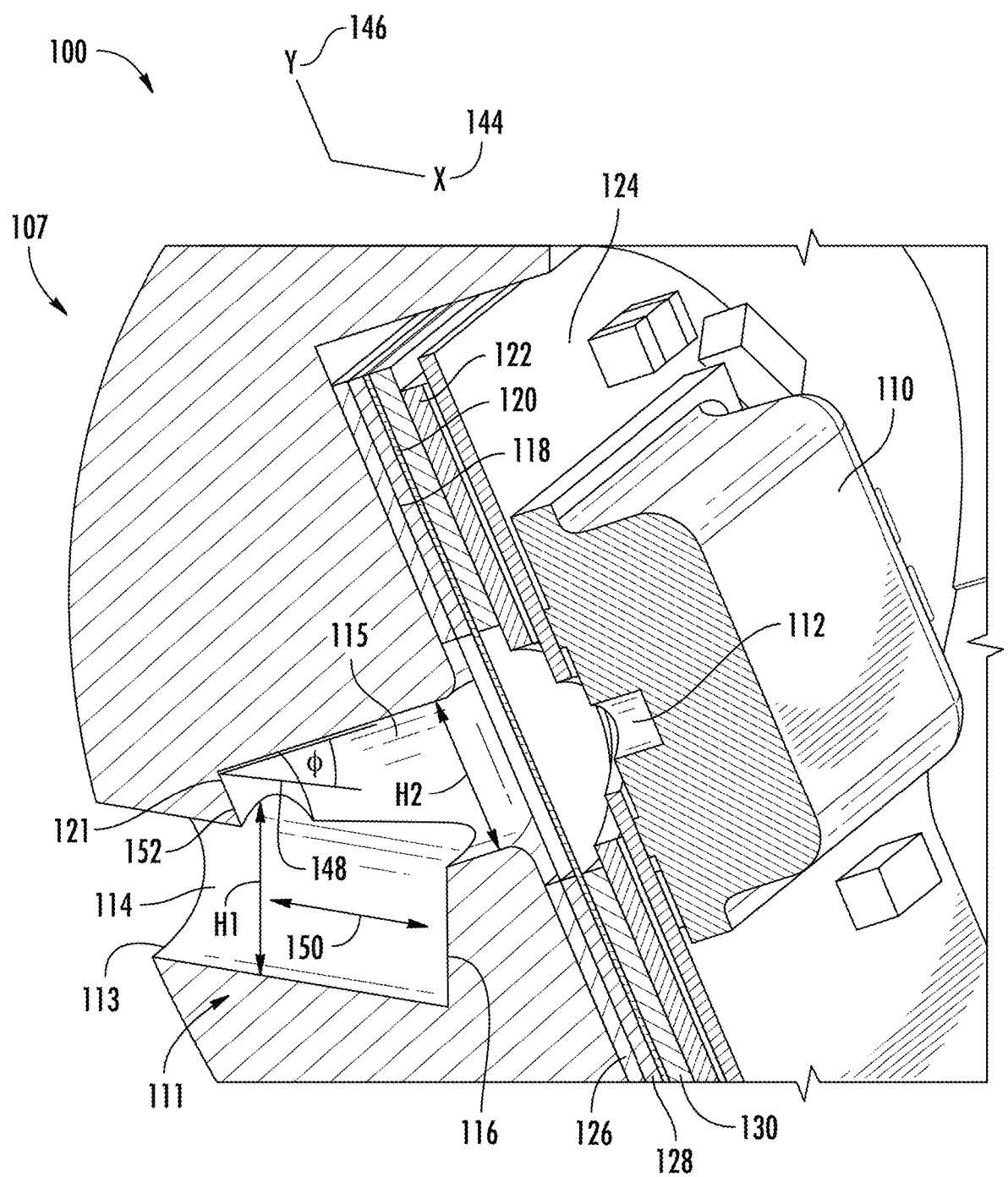
FIG. 4 provides a schematic diagram of an embodiment of an electronic device according to the present disclosure, particularly illustrating a component and a port of the electronic device.
Figure 5:
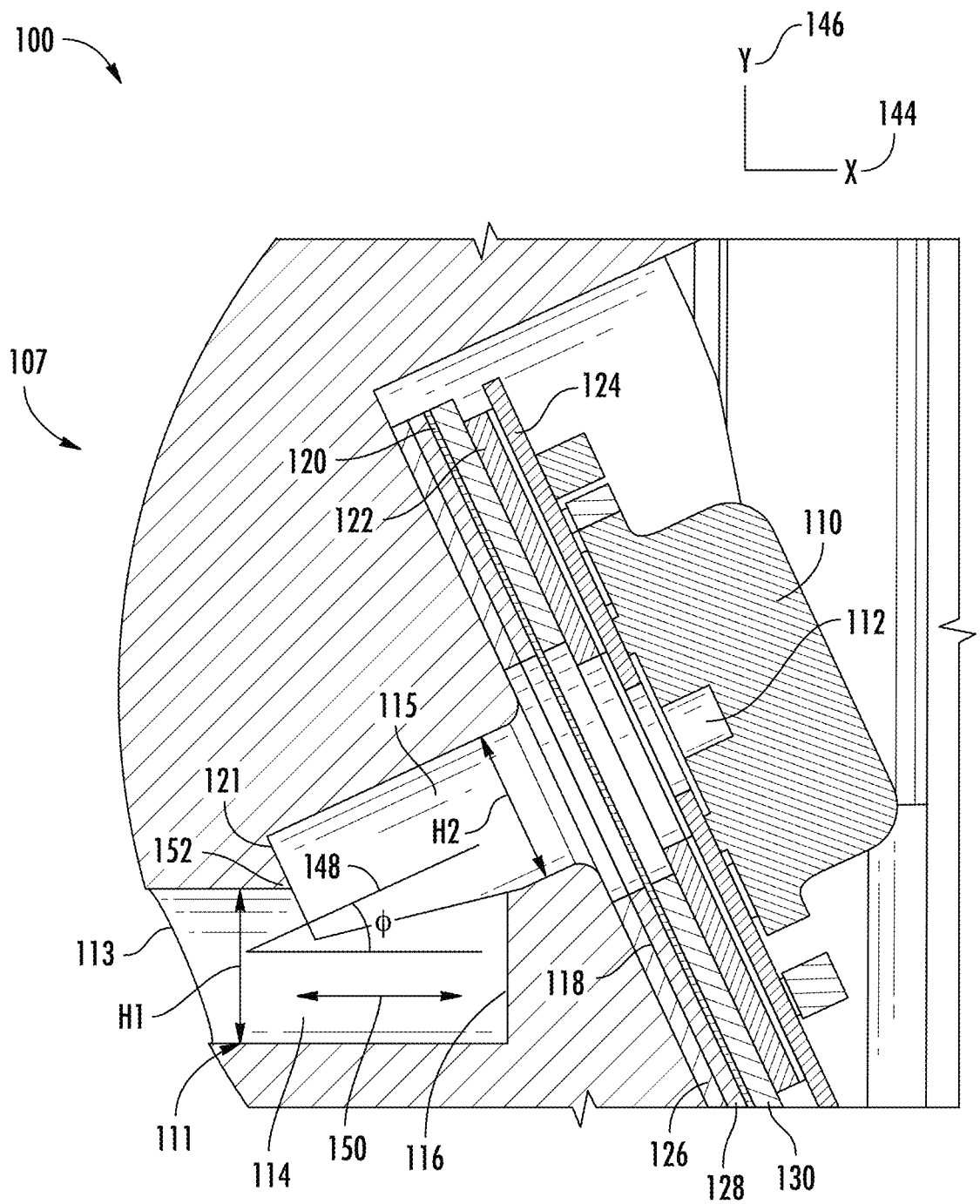
FIG. 5 provides a side, cross-sectional view of the electronic device of FIG. 4.

Furthermore, as shown in FIGS. 4 and 5, schematic diagrams of an embodiment of internal features of the wearable computing device 100 according to the present disclosure are provided. More specifically, as shown, the wearable computing device 100 further includes at least one internal, electronic component 110 having an aperture 112, the component port 111 with the opening 113, a fluid impermeable membrane 118, a backing mesh 120, a stiffener 122, one or more circuit boards 124 and various adhesive layers. In addition, as shown in the illustrated embodiment, the opening 113 of the component port 111 may be located on any suitable side of the housing 107, such as a first side 136 (FIG. 1) or second side 138 (FIG. 3) thereof. Further, the port 111 may extend inward into the wearable computing device 100 from the opening 113 such that the port 111 is adjacent to the aperture 112. It should be further understood that the port 111 may be placed at any suitable location on the wearable computing device 100.

More specifically, as shown generally in FIGS. 4-7, the component(s) 110 may be located within the housing 107 adjacent to the circuit board 124. The stiffener 122 may be located adjacent to the circuit board 124. Further, the backing mesh 120 may be placed between the aperture 112 of the component(s) 110 and an interior portion 115 of the port 111, described herein below.

The component(s) 110 may be any type of device which may require a pathway that extends to an outer location of the wearable computing device 100. For example, and without intending to be limiting, the component(s) 110 may be a microphone or an altimeter.

Further, the component(s) 110 may include an aperture 112 that allows for the component(s) 110 to output a signal outside of the wearable computing device 100 such as a sound wave or series of sound waves or allow for the component(s) 110 to take in a signal from outside the wearable computing device 100 such as atmospheric pressure. The connection of the aperture 112 to the external environment allowing for the intake or output of signals may be achieved through the port 111. In an embodiment, the port 111 may be centered radially around the aperture 112 of the component(s) 110 or, in the alternative, the port 111 may be placed anywhere else in connection with the aperture 112 of the component(s) 110.

Moreover, as shown, the port 111 may have an exterior portion 114 and an interior portion 115, with each portion having a particular geometry. For example, the exterior portion 114 of the port 111 may define the opening 113 and extend into the electronic device to define a first wall 116. The first wall 116 may be capable of preventing the ingress of foreign debris, which can damage the component(s) 110 of the wearable computing device 100. For example, if foreign debris/fluid enters the port 111 through the opening 113 on the wearable computing device 100, the first wall 116 may act as a stop that prevents the foreign debris from advancing further toward the component(s) 110.

Further, as shown, the exterior portion 114 may extend in a longitudinal direction 150 with reference to an x-axis 144 and a y-axis 146 for an x-y plane, where the y-axis extends 90 degrees from the x-axis 144. The exterior portion 114 may also have a height H1. The height H1 of the exterior portion 114 may be greater than or equal to about 0.5 millimeters (mm), such as 0.6 mm, such as 0.75 mm, such as 1 mm. Thus, by designing the exterior portion 114 to have a height H1, the exterior portion 114 may be large enough to allow the influx of air resulting from atmospheric pressure or signals such as sound waves.

In addition, the interior portion 115 of the port 111 may be provided. The interior portion 115 may extend inward from the exterior portion 114 of the port 111 towards the aperture 112 of the component(s) 110. For example, the interior portion 115 may connect to the aperture 112 of the component(s) 110 and may extend outward providing a connection to the exterior portion 114. As such, the interior portion 115 may be capable of further reducing the likelihood of damage caused by foreign debris to the component(s) 110. For example, if the interior portion 115 is placed above the exterior portion 114, foreign debris would have to move past the exterior portion 114 to enter the interior portion 115 and travel towards the component(s) 110.

In addition, the interior portion 115 may be placed adjacent to the aperture 112 of the component(s) 110. For example, the interior portion 115 may be centered radially around the aperture 112 of the component(s) 110. Further, in addition to the interior portion 115 having a position in relation to the aperture 112 of the component(s) 110, the interior portion 115 may have a predetermined angle 148 from which the interior portion 115 extends from the exterior portion 114. More specifically, if the exterior portion 114 extends along the x-axis 144, the interior portion 115 may be placed at the predetermined angle 148 ranging from about 0 degrees to about 105 degrees relative to the exterior portion 114, such as from about 5 degrees to about 95 degrees relative to the exterior portion 114, such as from about 10 degrees to about 85 degrees relative to the exterior portion 114.

Additionally, the interior portion 115 may have a height H2. The height H2 may be greater than or equal to about 0.3 mm, such as 0.4 mm, such as 0.5 mm, such as 0.6 mm, such as 0.8 mm. The interior portion 115 also defines a second wall 121. In particular, the second wall 121 may be above the exterior portion 114 and be towards the opening 113 of the wearable computing device 100. For example, the second wall 121 may be more proximal to the opening 113 of the wearable computing device in comparison to the first wall 116.

Further, the height of H2 of the interior portion 115 may be dependent upon the height H1 of the exterior portion 114, or vice versa. For example, the height H2 may be less than, equal to, or greater than H1. In particular, the height H2 may be from about 50% to about 150% of the height H1, such as from about 75% to about 125% of the height H1, such as from about 90% to about 110% of the height H1. By designing the wearable computing device 100 to have the ratio between the height H1 and the height H2, the port 111 may be capable of having the first wall 116 and the second wall 121 simultaneously.

The interior portion 115 described herein provides many advantages to the port 111, such as the ease of manufacturing the wearable computing device 100 with an exterior portion 114. For example, during manufacturing of the wearable computing device 100, the interior portion 115 may be formed at an angle at a location that would otherwise not be easily as accessible, except for the exterior portion 114.

Moreover, by using the interior portion 115, simpler tools may be used to bore holes into the wearable computing device 100. For example, if a manufacturer wishes to place the component(s) 110 at an angle from the exterior portion 114, the manufacturer may drill an exterior portion 114 into the wearable computing device 100. Once the exterior portion 114 has been drilled, another hole may be drilled at an angle toward the component(s) 110 into the exterior portion 114 to form the interior portion 115. By creating the interior portion 115 in this manner, a manufacturer can create a pathway from the exterior portion 114 to the component(s) 110 at an angle using simpler tools configured for drilling linear holes. Further, another benefit that may be achieved by including the interior portion 115 is that the component(s) 110 may be placed in a greater number of positions as a result of the exterior portion 114 in combination with the interior portion 115 being able to reach a greater number of positions.

In addition to the aforementioned features, the first wall 116 of the exterior portion 114 may be located beyond a region 152 at which the exterior portion 114 merges with the interior portion 115. For example, the first wall 116 may be placed further into the wearable device 100 in the x-direction when compared to the second wall 121. In this configuration, the first wall 116 of the exterior portion 114 may be more proximal to the aperture 112 of the component than the region 152 at which the exterior portion 114 merges with the interior portion 115.

Figure 6:
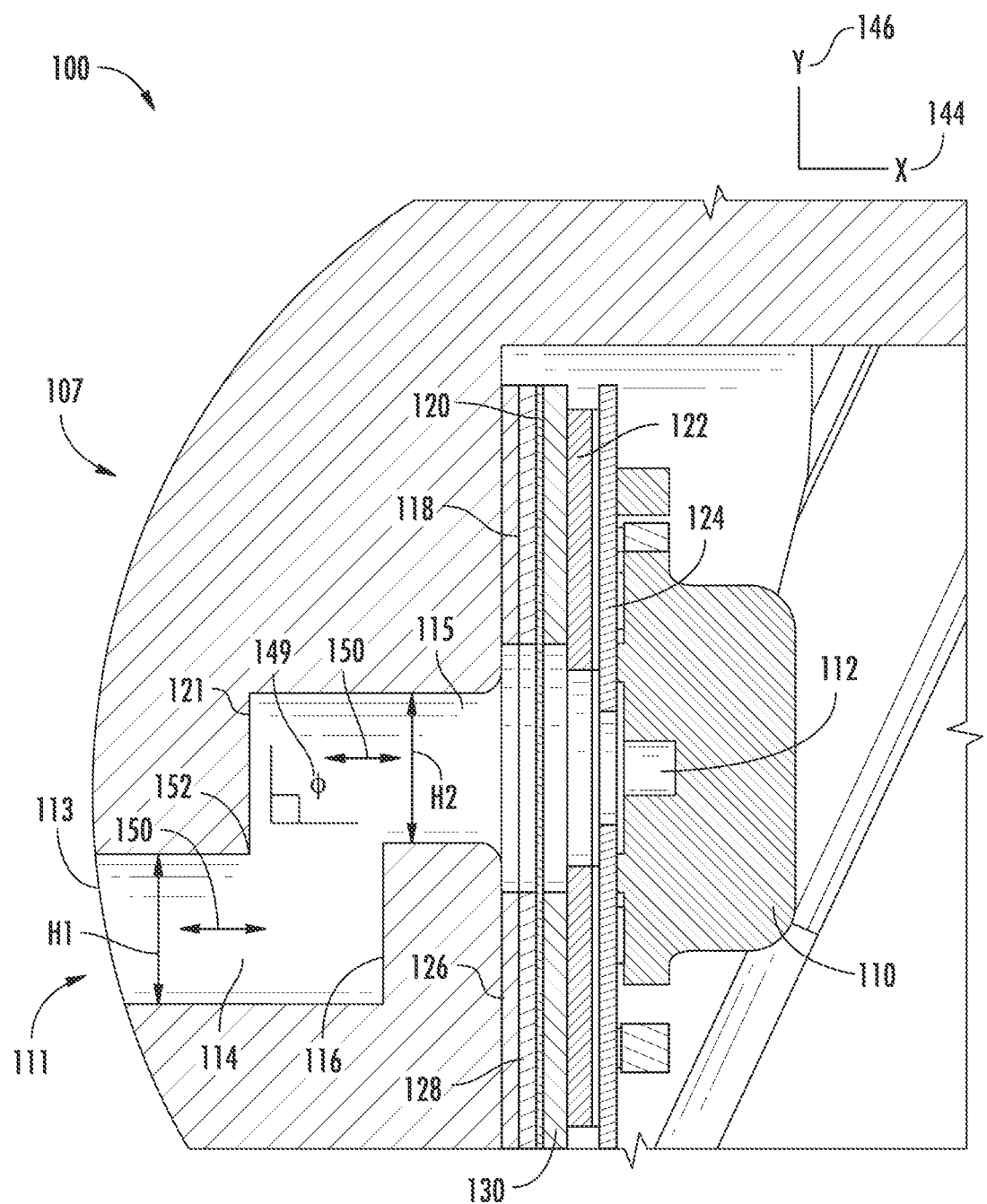
FIG. 6 provides a schematic diagram of an alternative embodiment of an electronic device according to the present disclosure, particularly illustrating an exterior port and an interior port.

Referring now to FIG. 6, a schematic diagram of another embodiment of an electronic device according to the present disclosure is illustrated. In particular, in an embodiment, the interior portion 115 may be disposed above the exterior portion 114, and the interior portion 115 and the exterior portion 114 may be generally parallel to each other in a longitudinal direction 150. For example, the angle between longitudinal direction 150 (corresponding to the direction of the exterior portion 114 and the interior portion 115) and the first wall 116 and the second wall 121 may be about 90 degrees.

Figure 7:
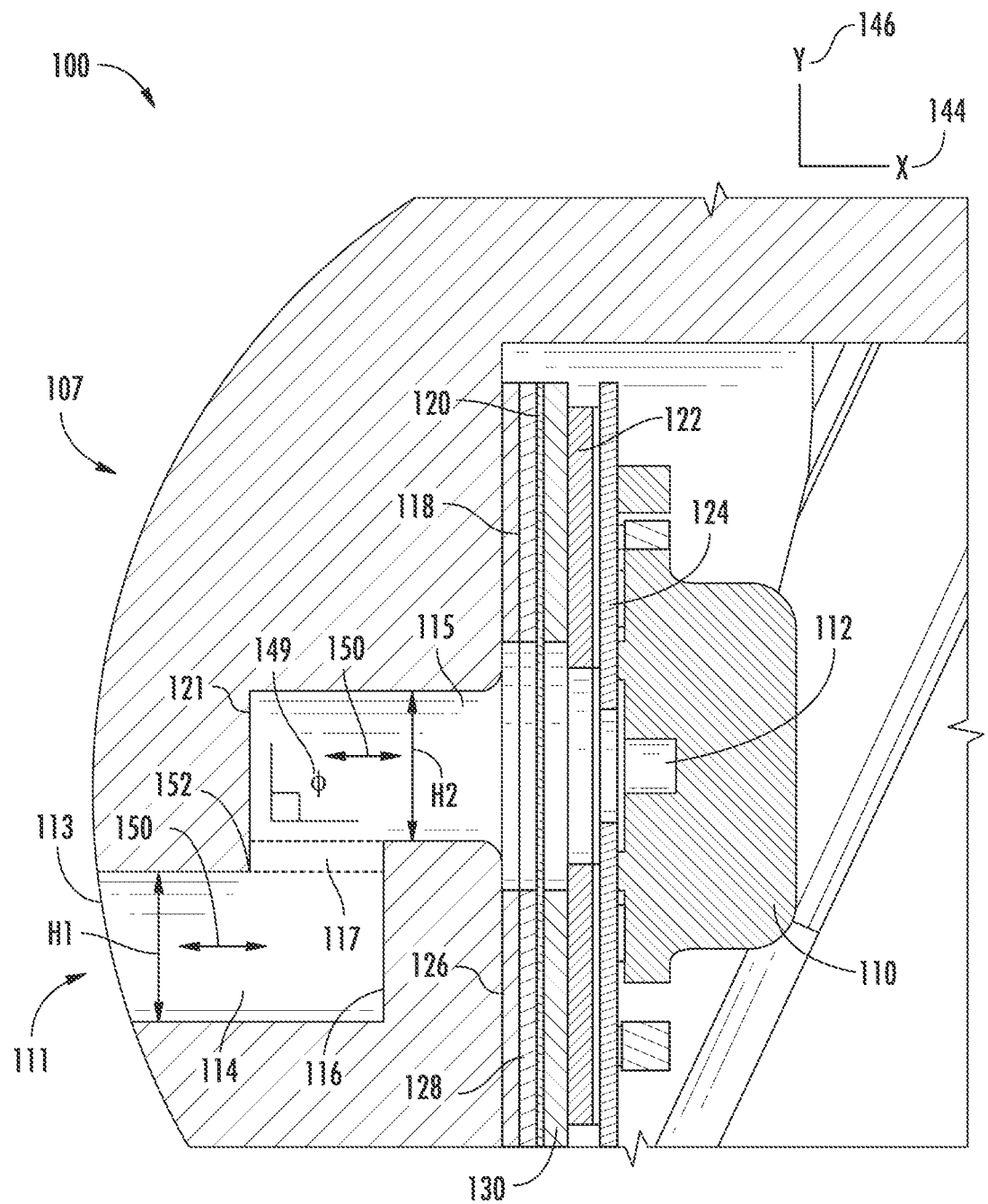
FIG. 7 provides a schematic diagram of an alternative embodiment of an electronic device according to the present disclosure, particularly illustrating a component, a port having an exterior portion and an interior portion, and a channel placed between the exterior portion and the interior portion.

Referring now to FIG. 7, a schematic diagram of still another embodiment of an electronic device according to the present disclosure is illustrated. Similar to FIG. 6, the interior portion 115 may be disposed above the exterior portion 114. However, as shown, a channel 117 may be placed between the exterior portion 114 and the interior portion 115. Further, the interior portion 115 and exterior portion 114 are not required to be parallel to each other. For example, the channel 117 may extend from the exterior portion 114 to the interior portion 115 at an angle 149 relative to the longitudinal direction 150 in which the exterior portion 114 extends. The angle 149 at which the channel 117 extends may range from about 65 degrees to about 115 degrees, such as about 75 degrees to about 105 degrees, such as about 85 degrees to about 95 degrees.

Referring generally to FIGS. 4-7, the fluid impermeable membrane 118 may be placed between the aperture 112 and the port 111. For example, the fluid impermeable membrane 118 may be placed between the interior portion 115 of the port 111 and the first adhesive layer 126. Moreover, in an embodiment, the fluid impermeable membrane 118 described herein may be composed of a polymer such as rubber or polytetrafluoroethylene (PTF), a silicone, a metal, an adhesive such as a glue, or a combination thereof. Further, the fluid impermeable membrane 118 may also include a water-resistant coating, an oil resistant coating, or a combination thereof. Moreover, the fluid impermeable membrane 118 may have a defined porosity. For example, the fluid impermeable membrane 118 may have pores with a selective size to allow for the entry of some fluids while preventing the entry of other fluids based on the molecular size of the fluids. More specifically, the pores may have a diameter ranging from about 0.01 to 1 micrometers (μm), such as 0.025 to 0.75 μm, such as about 0.05 to 0.5 μm.

The backing mesh 120 described herein may be composed of a metal, an alloy, a polymer, a composite, a ceramic, or any combination thereof. Further, the backing mesh 120 may have a thickness ranging from about 10 to 50 micrometers, such as about 20 to 40 μm, such as about 25 to 35 μm.

The stiffener 122 described herein may be composed of an epoxy, a polyimide, or metals such as aluminum or stainless steel. Further, the stiffener 122 may have a thickness ranging from about 0.05 to 1.5 millimeters (mm), such as about 0.1 to 1.25 mm, such as about 0.2 to 1 mm, such as about 0.5 to 0.75 mm.

The circuit board 124 described herein may include a prepreg, a laminate, a foil, a solder mask, and finish. The prepreg may be composed of a glass or a composite and include a resin coating chosen from an epoxy, a polyimide, a polytetrafluoroethylene, or any other resin one of ordinary skill in the art would find to be suitable to manufacture a circuit board. The laminate may be composed of sheets of the prepreg with foil placed therein. The foil may be composed of a metal such as copper and may be placed atop the prepreg or laminate. The solder mask may be composed of an epoxy and may be placed over the prepreg or laminate and the coil. The finish may coat the attached prepreg or laminate, copper foil, and solder and may be composed of a metal such as nickel, gold, tin, lead, or silver. Further, the circuit board 124 may have a thickness ranging from about 0.5 to 2.5 mm, such as about 0.75 to 2.25 mm, such as about 1 to 2 mm, such as about 1.25 to 1.75 mm.

The first adhesive layer 126, the second adhesive layer 128, and the third adhesive layer 130 may include a film which may be composed of polyethylene, chlorotrifluoroethylene, fluorinated ethylene propylene, or polytetrafluoroethylene. Further, one or all of the adhesive layers may have a thickness ranging from about 100 to 300 μm, such as about 125 to 275 μm, such as about 150 to 250 μm, such as about 100 to 200 μm.

Figure 8:
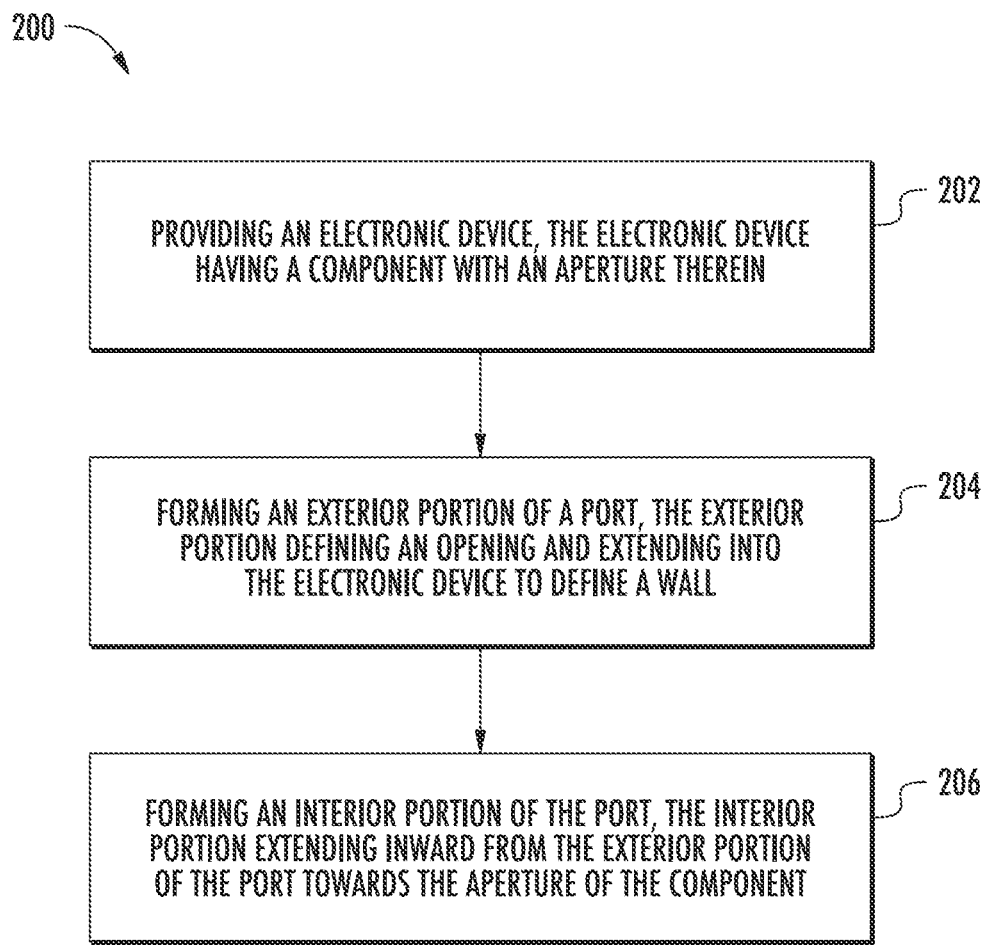
FIG. 8 provides a flow diagram of an embodiment of a method of manufacturing an electronic device according to the present disclosure.

Referring now to FIG. 8, a flowchart of a method 200 of manufacturing an electronic device capable of evacuating fluids according to the present disclosure is illustrated. As shown at (202), the method 200 includes providing an electronic device, the electronic device having a component with an aperture therein. As shown at (204), the method 200 includes forming an exterior portion of a port, the exterior portion defining an opening and extending into the electronic device to define a wall. As shown at (206), the method 200 includes forming an interior portion of the port, the interior portion extending inward from the exterior portion of the port towards the aperture of the component. The method 200 can include any additional steps that would be understood by one of ordinary skill in the art to manufacture an electronic device capable of evacuating fluids as described in detail above.

While various embodiments of the present disclosure have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the present disclosure, but instead as merely intended to highlight alternative or additional features that may or may not be utilized in a particular embodiment of the present disclosure. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

All of the features disclosed in this specification (including any accompanying exhibits, claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device, comprising:
   a housing;
   at least one internal component positioned within the housing, the internal component comprising an electronic component with an aperture;

a port defined by the housing, the port comprising:
- an exterior portion defining an opening in the wearable computing device, the exterior portion extending into the wearable computing device in a linear, longitudinal direction to define a first inner wall, the exterior portion defining a first linear pathway, the aperture of the electronic component being entirely behind the first inner wall in the longitudinal direction with respect to the opening such that the first inner wall is more proximal to the opening than the aperture of the electronic component in the longitudinal direction, and
- an interior portion extending inward from the exterior portion of the port to the aperture of the internal component, the interior portion defining a second linear pathway,
- the interior portion joining the exterior portion at an angle relative to the exterior portion, the angle ranging from 10 degrees to 85 degrees, the port defining a singular path into the housing and to the electronic component, the singular path defined only by the first and second linear pathways of the exterior portion and the interior portion.

2. The wearable computing device of claim 1, the interior portion centered radially around the aperture of the internal component.

3. The wearable computing device of claim 1, the internal component comprising a microphone, an altimeter, or a combination thereof.

4. The wearable computing device of claim 1, the exterior portion defining a first floor and a first ceiling defined by a first height with respect to a latitudinal direction, the first floor extending to the first inner wall, the first ceiling extending to a second inner wall, the exterior portion defining a length with respect to the longitudinal direction and the first linear pathway, the length from the first ceiling to the second inner wall being shorter than the length of the first floor to the first inner wall.

5. The wearable computing device of claim 4, the interior portion defining a second floor and a second ceiling defined by a second height with respect to a direction perpendicular to the angle that is relative to the exterior portion, the second floor and the second ceiling extending to the aperture of the component, the second floor extending to the first inner wall, the second ceiling extending to the second inner wall, the interior portion defining a length with respect to the angle relative to the longitudinal direction and the second linear pathway, the length from the second floor to the first inner wall being shorter than the length of the second ceiling to the second inner wall.

6. The wearable computing device of claim 1, the interior portion extending outward from the aperture of the internal component in a linear direction to define a second inner wall, the second inner wall being located above the first inner wall with respect to a latitudinal direction, the latitudinal direction being perpendicular to the longitudinal direction.

7. A method of manufacturing a wearable computing device, the method comprising:
- providing the wearable computing device, the wearable computing device comprising at least one internal component comprising an electronic component with an aperture;
- forming a port defined by a housing of the wearable computing device, the port comprising:
  - an exterior portion defining an opening in the wearable computing device, the exterior portion extending into the wearable computing device in a linear, longitudinal direction to define a first inner wall, the exterior portion defining a first linear pathway, the aperture of the electronic component being entirely behind the first inner wall in the longitudinal direction with respect to the opening such that the first inner wall is more proximal to the opening than the aperture of the electronic component in the longitudinal direction; and
  - an interior portion extending inward from the exterior portion of the port to the aperture of the internal component, the interior portion defining a second linear pathway, the interior portion joining the exterior portion at an angle relative to the exterior portion, the angle ranging from 10 degrees to 85 degrees, the port defining a singular path into the housing and to the electronic component, the singular path defined only by the first and second linear pathways of the exterior portion and the interior portion.

8. The method of claim 7, the interior portion centered radially around the aperture of the internal component.

9. The method of claim 7, the internal component comprising a microphone, an altimeter, or a combination thereof.

10. The method of claim 7, the exterior portion defining a first floor and a first ceiling defined by a first height with respect to a latitudinal direction, the first floor extending to the first inner wall, the first ceiling extending to a second inner wall, the exterior portion defining a length with respect to the longitudinal direction and the first linear pathway, the length from the first ceiling to the second inner wall being shorter than the length of the first floor to the first inner wall.

11. The method of claim 7, the interior portion extending outward from the aperture of the internal component in a linear direction to define a second inner wall, the second inner wall being located above the first inner wall with respect to a latitudinal direction, the latitudinal direction being perpendicular to the longitudinal direction.

* * * * *